T. Sault,

Steam Trap.

No. 1,441. Reissued Mar. 24. 1863

Witnesses
J. W. Coombs
G. W. Reed

Inventor
T. Sault
per Munn & Co
Attorneys

UNITED STATES PATENT OFFICE.

THOMAS SAULT, OF SEYMOUR, CONNECTICUT.

IMPROVEMENT IN TRAPS FOR STEAM APPARATUS.

Specification forming part of Letters Patent No. 27,313, dated February 28, 1860; Reissue No. 1,441, dated March 24, 1863.

*To all whom it may concern:*

Be it known that I, THOMAS SAULT, of Seymour, in the county of New Haven and State of Connecticut, have invented a new and Improved Trap for Steam Apparatus; and I do hereby declare that the following is a full, clear, and exact description of the same, reference being had to the accompanying drawings, forming a part of this specification, in which—

Figure 1:
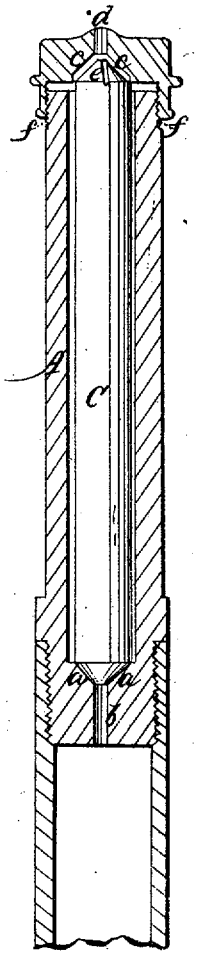
Figure 2:
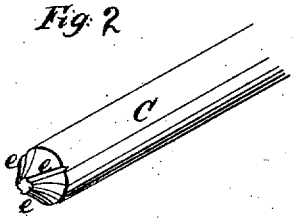

Figure 1 is a central section of my improved trap. Fig. 2 is a perspective view of a portion of the valve.

Similar letters of reference indicate corresponding parts in both figures.

My invention consists in a valve of what is known in the india-rubber and gutta-percha manufactures as "vulcanite," so applied within a box of metal or other material attached to a steam radiator or heater, or to any other steam apparatus where a trap is required, as to provide by the agency of its vastly greater contraction and expansion with changes of temperature, as compared with the material of which the box is made, either for the escape of any air or water that may have collected within the steam-space before the admission of steam thereinto, or for the admission of air to prevent the collapse of the apparatus by the formation of a vacuum therein after the steam has been shut off, in either case preventing the escape of steam.

To enable those skilled in the art to make and use my invention, I will proceed to describe its construction and operation.

The trap represented serves to provide for the escape of air or water from a steam-coil or other radiator or heater. A is the valve-box, consisting of a long cylinder of cast-iron or other metal, attached at its lower end to the steam pipe or radiator, or other steam heating apparatus, and provided at its upper end with a cap, B, which is screwed onto a screw-thread, *f*, cut on the exterior. In the bottom of the said box there is a seat, *a*, of conical or other form, in which there is an orifice, *b*, which forms a communication with the steam space, and in the cap B there is another seat, *c*, in which there is an orifice, *d*, which forms a communication with the atmosphere.

C is the valve, consisting of a long cylinder or spindle-like piece of the substance known as "vulcanite"—that is to say, a hard vulcanized compound of india-rubber or gutta-percha, or their allied gums—having its external diameter smaller than the internal diameter of the box A, and having its end formed to fit, respectively, the two seats *a* and *c*. The upper end or face of the said valve is provided with a series of radial grooves, *e*.

The operation of this valve C is as follows: The cap B having been so adjusted on the screw-thread *f* of the box, while the box and valve are cold, as to leave a little longitudinal play between the valve and the two seats *a* and *c*, when steam has generated in the boiler and is admitted into the steam-pipe, it drives the air or water toward the valve C, and such air or water, having only a small surface exposed to the steam, cannot be quickly heated thereby, and therefore cannot quickly heat and cause the expansion of the valve, but is forced by the pressure of the steam against the valve and caused to lift the latter, which is very light, from its seat *a*, and hold it against the seat *c*, and hence the air or water is allowed to pass through the orifice *b*, between the lower end or face of the valve, up between the sides of the valve and box and through the grooves *e e* of the upper face of the valve to the orifice *d*, and thence to the atmosphere; but when all the air or water has been expelled and steam enters the box, the valve becomes quickly heated, and notwithstanding that the box is heated also, the valve, owing to the greater expansive property of the substance of which it is composed, soon increases so much in length as to fit tightly between the two seats *a* and *c*, thus closing the orifice *b* and shutting in the steam. When steam goes down again, or is shut off, the valve contracts lengthwise more than the box, and so provides for the expulsion of the air or water in the same manner as before, when the steam is again admitted.

When it is desired to use the trap to admit air to the interior of the radiator or other steam apparatus to prevent its collapse by the formation of a vacuum within it on the condensation of the steam, the grooved end of the valve should be downward, so that when the valve is loose and only in contact with its lower seat, *a*, air may pass the said seat to reach the orifice *b*. In such a case, when the valve is expanded by the heat of the steam, it closes tightly in the seat *e*; but in this construction of the valve the trap will only serve to admit air and not provide for its escape unless the valve be made heavy enough to overcome the pressure of the steam, when it would serve both purposes.

The advantage possessed by this trap consists in the very highly expansive and contractile property developed in what is known as "vulcanite" as compared with almost all other substances under changes of temperature.

The box A, instead of being made of metal, may be made of any other material which expands and contracts under the influence of changes of temperature in a sufficiently less ratio than vulcanite. I have contemplated making the box of glass, which I believe to be very suitable for the purpose.

What I claim as my invention, and desire to secure by Letters Patent, is—

The employment in a trap for steam apparatus of a valve of vulcanite, applied to operate, substantially as described, between two opposite seats in a box of metal or other material whose expansibility by heat is less than that of the valve.

THOMAS SAULT.

Witnesses:
H. W. RANDALL,
W. B. STODARD.